(12) United States Patent
Ying (10) Patent No.: US 7,068,227 B2
(45) Date of Patent: Jun. 27, 2006

(54) INTEGRATED ANTENNA ASSEMBLY (75) Inventor: Zhinong Ying, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/513,147

(22) PCT Filed: Apr. 28, 2003

(86) PCT No.: PCT/EP03/04456

§ 371 (c)(1),
(2), (4) Date: May 24, 2005

(87) PCT Pub. No.: WO03/094373

PCT Pub. Date: Nov. 13, 2003

(65) Prior Publication Data

US 2005/0219144 A1    Oct. 6, 2005

Related U.S. Application Data

(60) Provisional application No. 60/378,453, filed on May 6, 2002.

(30) Foreign Application Priority Data

May 2, 2002    (EP) ................................. 02009866

(51) Int. Cl.
*H01Q 1/24*    (2006.01)
*H01Q 1/36*    (2006.01)

(52) U.S. Cl. ...................................... 343/702; 343/895
(58) Field of Classification Search ................ 343/702, 343/895; 348/14.02
See application file for complete search history.

(56) References Cited

U.S. PATENT DOCUMENTS

| 5,666,159 A | 9/1997 | Parulski et al. |
| 5,838,639 A | 11/1998 | Hwang |
| 6,327,484 B1 | 12/2001 | Mathew |
| 2003/0044678 A1* | 3/2003 | Winarski .................... 429/162 |
| 2005/0088530 A1* | 4/2005 | Homma et al. ......... 348/207.99 |
| 2005/0253923 A1* | 11/2005 | Komori et al. .......... 348/14.02 |

FOREIGN PATENT DOCUMENTS

| JP | 2001104241 | 4/2001 |
| KR | 2001-0059498 | 7/2001 |

* cited by examiner

*Primary Examiner*—Tan Ho
(74) *Attorney, Agent, or Firm*—Jenkens & Gilchrist, P.C.

(57) ABSTRACT

A mobile radio terminal in which a miniature antenna is integrated or spatially arranged with a camera lens. The mobile radio terminal includes a housing having a microphone, a speaker, a display, a keypad which might be optional if the display is touch-sensitive, and a camera. The antenna is arranged around a camera lens as an antenna-lens-assembly inside the housing in order to minimize space consumption, decrease hand-interference and minimize antenna losses.

20 Claims, 7 Drawing Sheets

(PRIOR ART)

INTEGRATED ANTENNA ASSEMBLY

This application is a national phase filing of International Application No. PCT/EP03/04456, filed Apr. 28, 2003, which claims priority to U.S. Provisional Application No. 60/378,453, filed May 6, 2002, and to European Patent Application No. 02009866.1, filed May 2, 2002.

TECHNICAL FIELD OF THE INVENTION

The invention relates generally to radio communication systems and, in particular, to the design of built-in miniaturised antennas which allow compact electronic equipment to communicate.

BACKGROUND OF THE INVENTION

Compact electronic equipment is required to be compact in size, especially when portable. Therefore all components incorporated in portable electronic radio equipment have to fulfill this requirement. Furthermore the spatial arrangement of the components of the portable electronic radio equipment has to be as compact as possible due to the above requirement. Also, the components should not interfere with each other. As more features are integrated in portable electronic radio equipment, such as cameras, the requirement of minimal size is harder to fulfill. Therefore a need exists to find new ways of assembling the components of portable electronic radio equipment.

The term portable electronic radio equipment, which hereinafter is referred to as a mobile radio terminal, includes all equipment such as mobile telephones, pagers, communicators, i.e. electronic organisers, smartphones or the like, PDAs (Personal Digital Assistants), portable communication apparatus etc.

Traditionally, older mobile radio terminals were only capable of normal speech communication between two users through a mobile communications network or a public switched telephone network. Historically, mobile radio terminals often have an antenna mounted externally to the housing of the mobile radio terminal. More recently, mobile radio terminals have built-in antennas.

Even more recently, short-range supplementary communication services have been introduced for mobile radio terminals. One example of such a short-range supplementary communication service is commonly referred to as Bluetooth® and operates within an unlicensed frequency band at 2.4 GHz, which is often referred to as ISM ("Instrumental, Scientific and Medical") and is globally available. Bluetooth® is intended to provide flexible communication of data and speech between portable devices, such as mobile telephones, mobile computers, other handheld devices and various peripherals for these devices, such as printers, wireless headset accessories, etc.

Furthermore, Wireless Local Area Network (W-LAN) solutions provide extended reach of hard-wired Local Area Networks (LANs) allowing to connect e.g. to the Internet or a corporate network. Wireless LAN access zones are even being installed at public places such as conference areas, hotels, airports and railway stations offering users wireless connection to networks. Future mobile radio terminals will support W-LAN technology. W-LAN is currently based on 2.4 GHz technology, but future products will even support frequencies of 5.8 GHz or above for enhanced performance.

Moreover, mobile radio terminals with built-in cameras have been introduced. These mobile radio terminals comprise a camera unit with a camera lens assembly. The mobile radio terminals equipped with said camera units offer the possibility of image communication. The image communication can take place in several ways, such as via the above described wireless Bluetooth® communication for direct printing of the captured pictures or films, or transmission to other units such as other mobile radio terminals or mobile computers. Another way of transmitting the images is via the above described W-LAN directly to a network, such as an enterprise network, and directly accessing all available network resources, such as network printers, networked computers etc. Even another way of transmitting the images is by using a transmission via the above mentioned mobile communications network or public switched telephone network. All transmissions have in common that they are performed electromagnetically wireless and therefore need an antenna for communicating.

Figure 3:
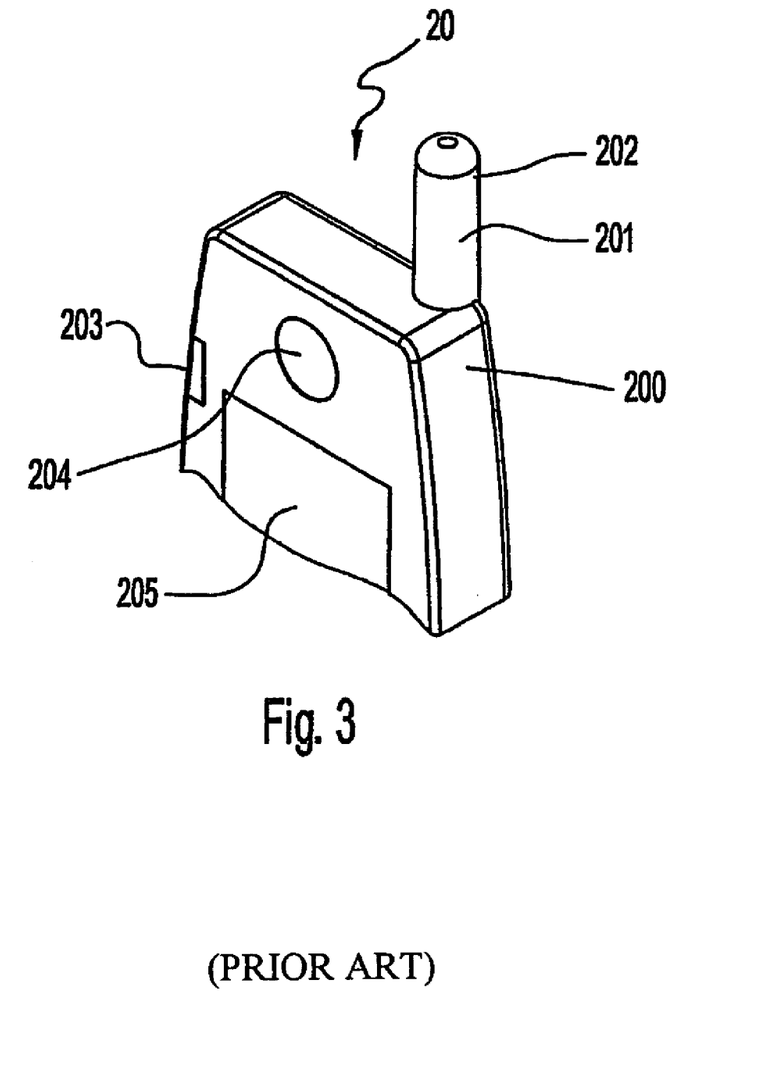
FIG. 3 is a perspective view of a prior art mobile radio terminal with an external antenna and a camera.

A mobile radio terminal for image communication with an integrated camera lens assembly is known from KR-A-2001059498. According to FIG. 3, a mobile radio terminal 20 is described therein and has an antenna 201 inside a cover 202 extending on the upper side of the housing 200. A camera lens assembly 203 is installed beside an ear piece 204 and a display 205. As mentioned above, it is desired to have such an antenna integrated in or built-in within the housing of the mobile device in order to render the mobile radio terminal more compact.

US-B1-6 327 484 describes a cellular telephone having an integrated laser pointer. The laser pointer is built into an antenna assembly arranged externally on the housing of the cellular telephone. Furthermore the laser pointer assembly comprises an optical lens through which a substantially coherent beam of visible light is emitted from a laser diode and transmitted away from the cellular phone to a remote point that is to be highlighted by the laser beam of the laser pointer. However, the lens is not adapted to be used as a camera lens. The optical lens disclosed is rather adapted to focus and concentrate a beam of light from the inside of the telephone to the outside of the telephone to a remote location. Furthermore the antenna of the laser pointer assembly is not arranged in a space-saving manner.

JP 2001 104241 discloses an endoscopic capsule having an integrated image sensor and an antenna for radio transmitting electric signals outputted from the image sensor. A transmitting antenna for transmitting the signal is wound around the periphery of an electric component holding tube comprising electronic circuits and batteries for the capsule.

U.S. Pat. No. 5,666,159 discloses an electronic camera system for selectively transmitting electronic image data to a plurality of remote base units. A camera module is detachably coupled to a portable computer. The electronic image data generated by the camera module is supplied through the portable computer and therefrom to a radio frequency transmitter module for transmission to the selected base unit. The radio frequency transmitter module is either formed integral with the portable computer or like the camera module, it is detachably coupled to the portable computer. The camera module is always separated from the transmitter module. The disclosed device is not space saving.

As mobile radio terminals on one hand become smaller and on the other hand more features, such as the above mentioned camera function, are integrated into the mobile radio terminal, various problems are associated with the conventional way of arranging antennas inside conventional mobile radio terminals.

One problem is that an antenna, if integrated in the housing of the mobile radio terminal, as desired, consumes valuable space and renders the mobile radio terminal larger than desired.

Another problem is possible hand interference of the user's hand with the electromagnetic field of the antenna. This problem can arise if the antenna is so arranged that the hand of the user holding the mobile device disturbs the field of the antenna, due to ergonomic arrangements too near to the antenna. Cellular radio circuitry is prioritised in the layout of the printed circuit board, and as a result, in existing mobile radio terminals, the built-in antennas were placed in areas where the performance of the antenna was disturbed by the hand of the user.

A further problem arises if the mobile radio terminal is equipped with multiple antennas, e.g. working in different frequency ranges, because the antennas can disturb each other if they are positioned too close to each other. In order to avoid this interference, expensive filtering components have to be provided for isolating the antennas from each other.

Furthermore, low loss of the antenna is desired. When integrating antennas in the housing, the housing can absorb transmission energy, which is not desired.

SUMMARY OF THE INVENTION

Various embodiments of the invention overcome the above-identified deficiencies in the art by providing a mobile radio terminal comprising a miniature, built-in antenna which is integrated with a camera lens.

A mobile radio terminal comprises a spatial arrangement or integration of a communication antenna with a camera lens for application in devices where space reduction is a requirement, such as in a mobile radio terminal or a camera. The antenna is integrated into an already existing, previously unused space in such a device comprising the camera. This space is located on or around the circumferential surface of the lens of the mentioned camera or in the space between the lens and the housing of the device. The lens is usually placed in a free area which both has less interference with the human body and provides an opening in the housing of the device for the camera and the lens.

According to exemplary embodiments, built-in miniaturised antennas are provided, which are spatially arranged or integrated with a lens. As a result, the mobile radio terminal according to the invention has the advantage of providing a space saving, compact antenna arrangement with low loss and little or no interference.

BRIEF DESCRIPTION OF THE DRAWINGS

Preferred embodiments of the present invention will be described in the following detailed disclosure, reference being made to the accompanying drawings, in which.

DETAILED DESCRIPTION OF EMBODIMENTS

Figure 1:
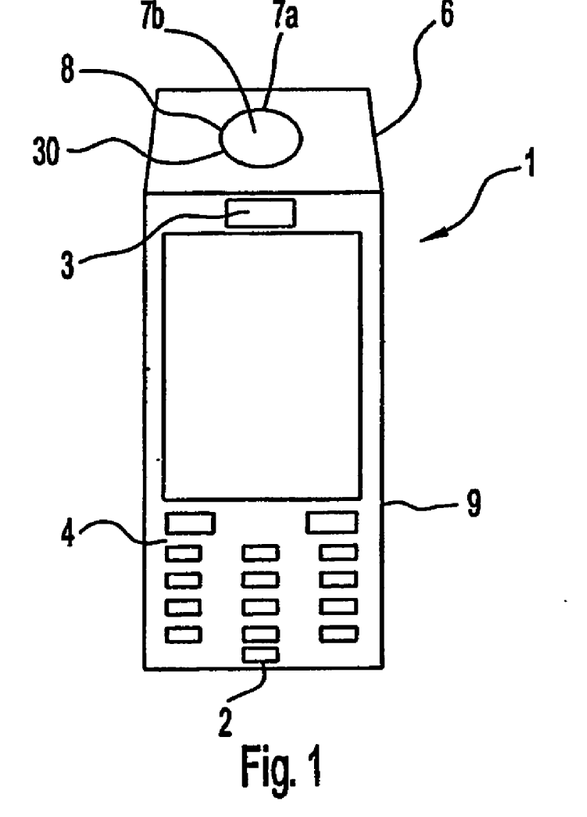
FIG. 1 is a schematic front view of a mobile radio terminal according to an embodiment of the invention.

FIG. 1 illustrates a mobile radio terminal 1 according to the invention in which an antenna assembly is implemented. The mobile radio terminal 1 includes a housing 6 having a microphone 2, a speaker 3, a display 5, a keypad 4 which might be optional if the display 5 is touch-sensitive, a camera unit 7a, an antenna-lens-assembly 30 having an antenna 8 and an optical lens means 7b, and electronic circuits 9 inside the housing, such as a main controller, memory circuits, radio transceiver etc.

Figure 2:
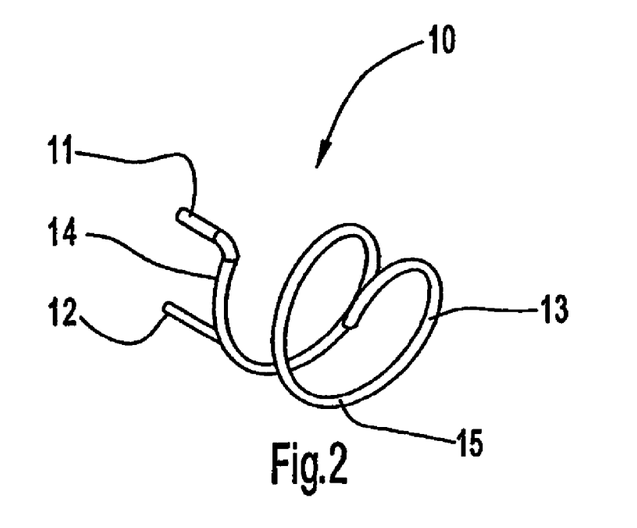
FIG. 2 is a perspective view of a helical antenna.

FIG. 2 shows a helical antenna 10 having an elongated conductor 13 arranged as a helix, forming a radiating element 15, wherein said elongated conductor 13 preferably has a length which is approximately one-quarter of a wavelength of a desired operating resonant frequency of the antenna. The operating frequency of the antenna for Bluetooth® or W-LAN is 2.4 GHz, for GSM at about 900 or 1800 MHz or for WCDMA (Wideband Code Division Multiple Access) at about 2000 MHz, but the helical antenna 10 can be, depending on its length, operated in the frequency range of 800 MHz to 6000 MHz. The helical antenna 10 furthermore preferably has a grounding pin 11 and a feeding pin 12, whereby the grounding pin 11 is located such that the length of a matching post 14 is used to match the antenna to a desired impedance of a transmitting/receiving unit, such as e.g. 50 Ohms. Those skilled in the art understand that in certain cases the grounding pin 11 is not needed, e.g. a pure helix can be matched for 50 Ohms.

Figure 4A:
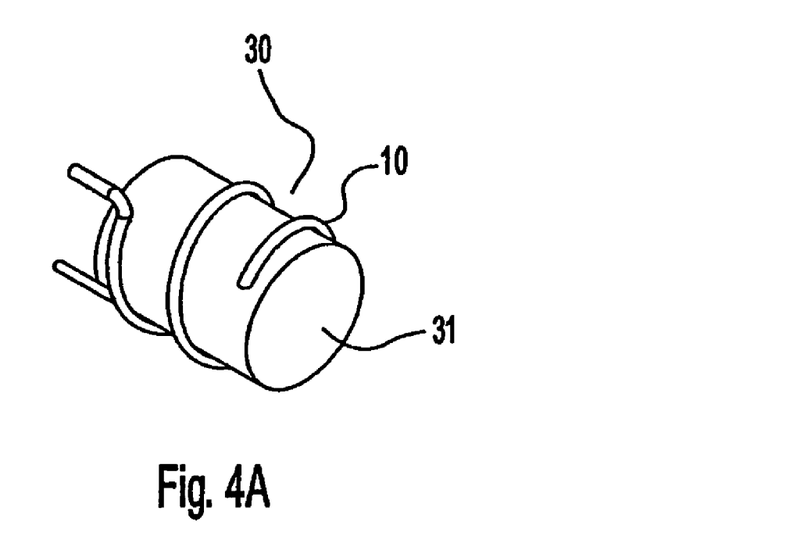
FIG. 4A is a perspective view of an antenna-lens-assembly with a helical antenna spatially arranged in close vicinity to a camera lens, according to a preferred embodiment of the invention.

FIG. 4A illustrates a preferred embodiment of the antenna-lens-assembly 30. The helical antenna 10 is in the form of a spiral or a helix and is located on or in the outer side wall or in close proximity around a lens 31 of a camera in a device as mentioned above. Thereby the spiral or helix has a helix trace preferably in the range of a quarter wavelength of the operating wavelength of the antenna. The helical antenna 10 is arranged along the circumferential outer surface of the lens 31, which is generally a cylindrical lens body. The lens 31 is part of the image capturing part of a camera, such as the camera unit 7a in the mobile radio terminal 1 in FIG. 1. The lens 31 is made of a transparent material, such as plastic or glass having little or no loss in the working frequency of the helical antenna 10.

Figure 4B:
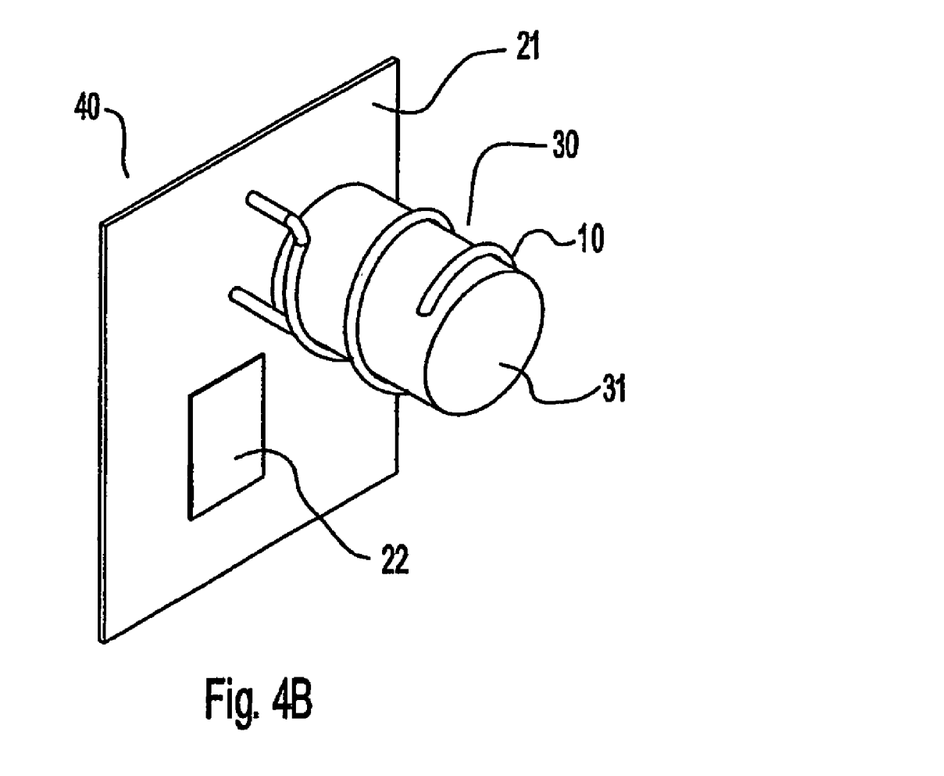
FIG. 4B is a perspective view of a printed circuit board with the antenna-lens-assembly of FIG. 4A.

FIG. 4B shows the assembly 40 of the antenna-lens-assembly 30 of FIG. 4A mounted on and electrically connected to, e.g. by a pogo-pin or by soldering, a printed circuit board 21. The helical antenna 10, when built-in in such a way into a housing of a compact electronic device, e.g. the housing 6 of mobile radio terminal 1, is much less space consuming than the prior art shown in FIG. 3. This is desired and contributes to the mobile radio terminal being minimal in size.

The printed circuit board 21 is equipped with other components, such as e.g. a CCD image capturing device between the lens and the printed circuit board, an image memory, a driver circuit for a display, etc. These components are only exemplary illustrated as box 22 because it is believed that those skilled in the art are acquainted with the fact that further components exist in order to provide a functioning mobile radio terminal.

The housing 6 of a mobile radio terminal 1 must have an opening at the location of the camera lens 31, the antenna-lens-assembly 30 is placed into an opening of the housing 6 of the mobile radio terminal 1. Thus the housing interference of the helical antenna 10 is minimal because the electromagnetic radiation of the antenna is, in said position, not influenced by a closed housing. Furthermore user interference is minimised because the hand of the user will be so arranged as not to cover the lens opening because otherwise it would be impossible to take pictures with the camera.

Measurements were undertaken based on an antenna-lens-assembly 30 in a mobile radio terminal 1. Results for a Bluetooth® antenna in the above mentioned unlicensed frequency band at 2.4 GHz showed that the antenna both solves the above mentioned problems and works according to specifications, as desired, without disturbing the function of other components.

Figure 5A:
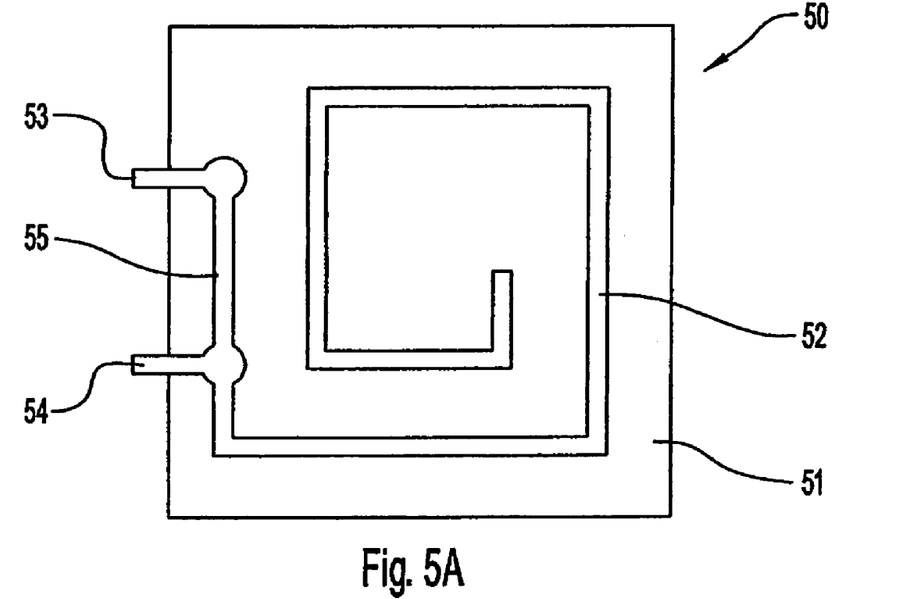
FIG. 5A is a planar view of another antenna arranged on a carrier film.

FIG. 5A shows an alternative antenna device 50, wherein an antenna 52 is mounted upon a flexible support element or carrier 51, such as a dielectric plastic film. Such support elements are very thin, in the range of about 100 to 400 μm. Thus the antenna device 50 is very flexible. A single exemplary antenna 52 is illustrated in FIG. 5A, whereby multiple antennas can be implemented on different portions of the film surface or by multi-layer technique.

Figure 5B:
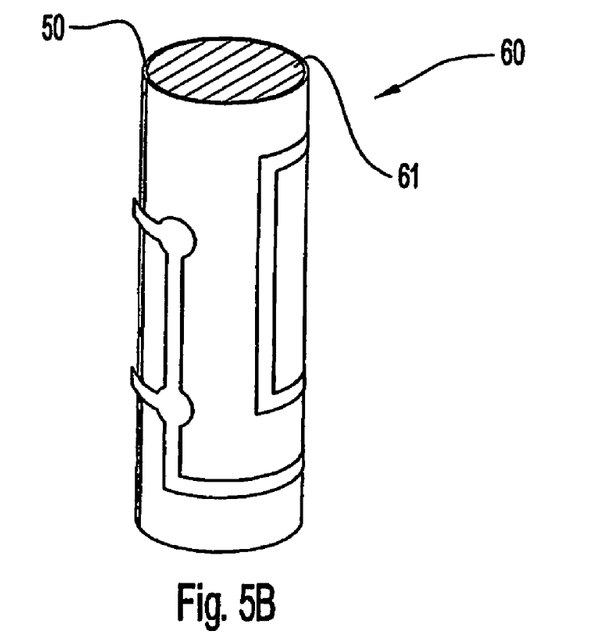
FIG. 5B is a perspective view of a spatial arrangement of an antenna assembly of FIG. 5A, according to an alternative embodiment of the invention.

An alternative embodiment of an antenna-lens-assembly 60 is illustrated in FIG. 5B. The antenna device 50 of FIG. 5A is spatially arranged around a camera lens 61. The film is bent in an appropriate way so as to fit around the camera lens 61 and is attached to the lens using an appropriate means such as glue or a self-adhesive film. The antenna-lens-assembly 60 is arranged similarly to FIG. 4B on a printed circuit board.

Figure 6A:
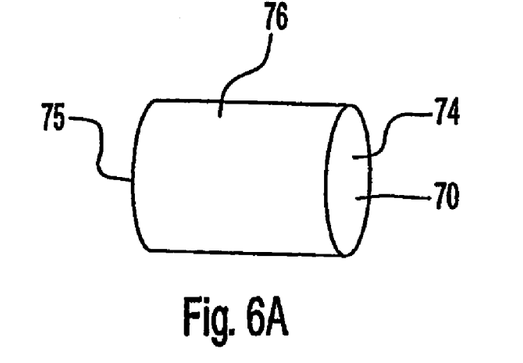
FIGS. 6A to 6D are perspective views of alternative antenna arrangements according to alternative embodiments of the invention.

A generally cylindrical lens 70 without an antenna is shown in FIG. 6A. The lens 70 has two ends, 74 and 75, and a circumferential side wall 76. The lens 70 is preferably made of a material which is both transparent, for the imaging function of the camera, and which has a low loss in the microwave region in which the antenna operates, so that the antenna is working effective. Such materials are plastic or glass as mentioned above.

If the lens 70 is part of a fixed-focus camera, the lens 70 is steadily attached in a fixed position relative to the image capturing means of the camera, e.g. a CCD.

However, if the lens 70 is part of a camera with adjustable focus, the lens 70 has to be movable in order to be able to adjust the focus of the camera.

According to an embodiment, the antenna is attached or integrated in the lens, and will thus be moved with the lens when adjusting the camera focus. Therefore a connecting means, such as a flexible connector has to be provided to flexibly connect the antenna to an electrical contact on a printed circuit board within the device.

According to another embodiment, illustrated in FIG. 8 and described in detail below, the antenna 92 is attached to a rigid sleeve 91, having a interior free space 90 adapted for a lens to fit inside, thus allowing the lens to be movable if desired without the need for a flexible connection of the antenna as mentioned above.

Furthermore it is to be noted that the expression "lens" even comprises lens units, such as a camera objective comprising several lenses integrated in a common housing, e.g. "zoom-lenses".

Figure 6B:
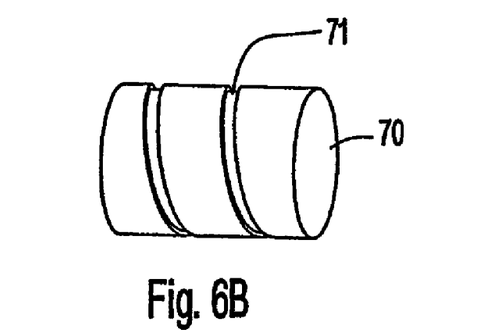
Figure 6C:
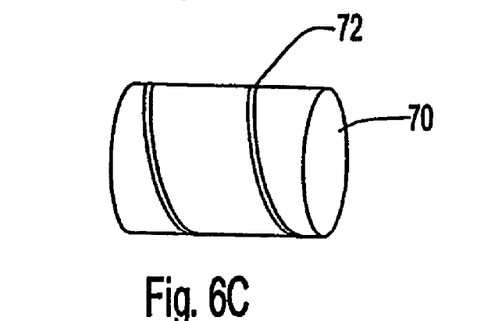

FIGS. 6B and 6C provide illustrations of further alternative embodiments, wherein FIG. 6B shows an antenna 71 integrated in the lens 70 by means of grooves in the side wall of the lens 70. An antenna 72 in FIG. 6C is directly attached on the side wall of lens 70. The antenna 72 is attached by appropriate means such as glue or a resilient means.

By forming the helical antenna 71 or 72 with a diameter slightly smaller than the lens 70 diameter, a resilient press-fitting of the antenna 71 or 72 to the lens 70 is achieved. Preferably the antenna 71 or 72 is attached to the lens 70 or printed or etched directly on the side wall of the lens 70 body, as shown in the alternative embodiments illustrated in FIG. 6B and FIG. 6C.

Figure 6D:
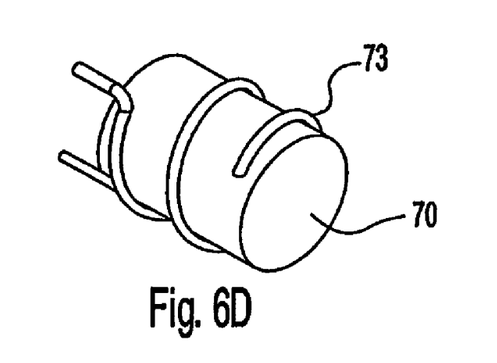

In FIG. 6D a further embodiment is illustrated, similar to that of FIG. 4A, whereby the antenna 73 has no grounding pin, as mentioned above.

Figure 7A:
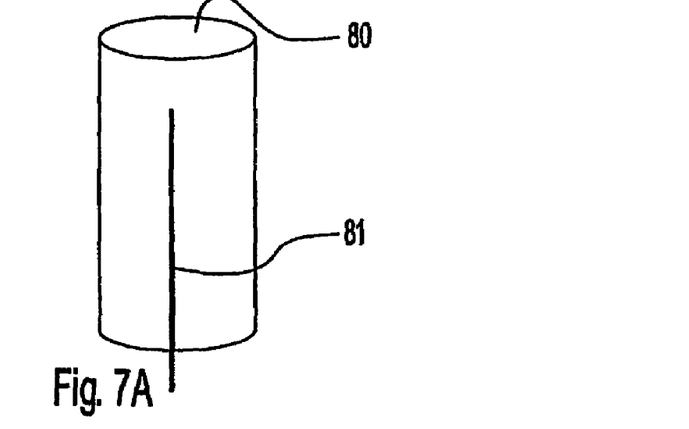
FIGS. 7A to 7E are perspective views of further alternative antenna arrangements according to alternative embodiments of the invention.
Figure 7B:
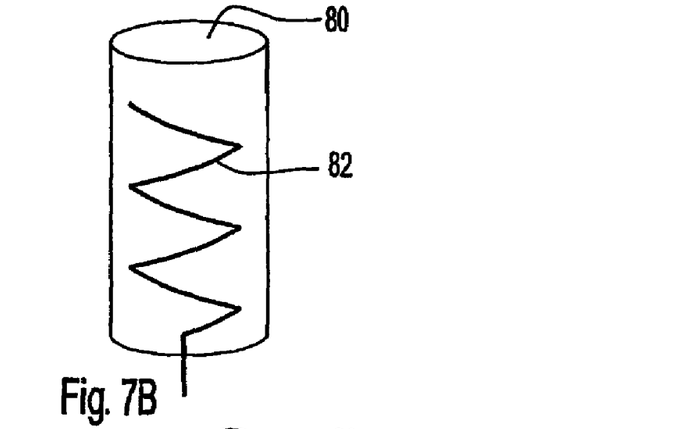
Figure 7C:
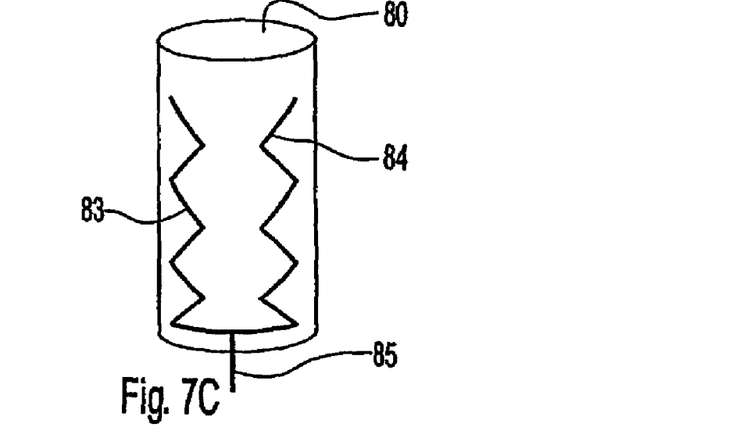
Figure 7D:
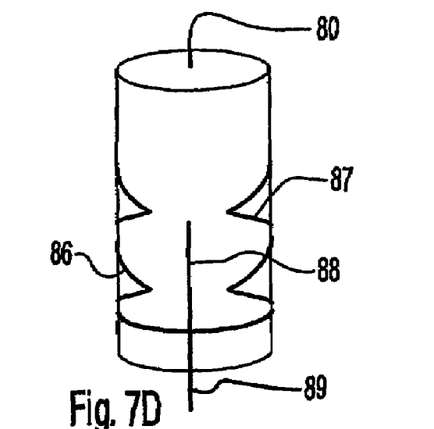
Figure 7E:
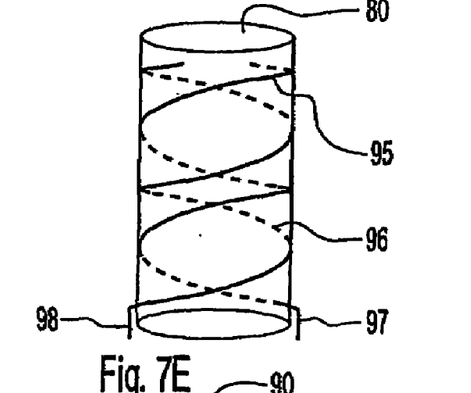

Further alternative embodiments are shown in FIGS. 7A to 7E, wherein a lens 80 is shown with attached antennas. The antenna 81 in FIG. 7A is a straight monopole antenna, while the antenna 82 in FIG. 7B has a zig-zagged shape. FIG. 7C shows a multi-branch antenna with branches 83, 84, and a common feeding pin 85. FIG. 7D illustrates a multi-branch antenna having 3 branches 86, 87 and 88 and a common feeding pin 89, and FIG. 7E shows an arrangement of multiple antennas 95 and 96 having respective feeding pins 98 and 97. As illustrated in FIGS. 7A to 7C, the antenna can be arranged so that it partly covers the surface of lens 80, leaving space for further antennas to be arranged, thus allowing multiple antennas to be arranged around the lens 80.

Figure 8:
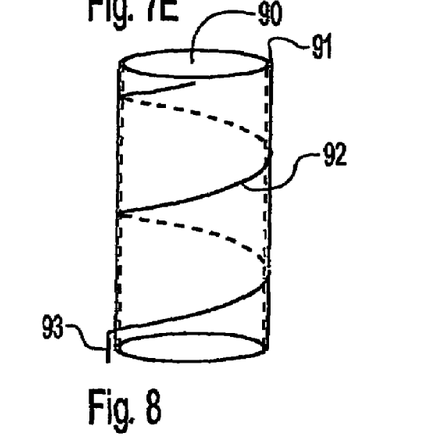
FIG. 8 is a perspective view of a carrier for an antenna according to another embodiment of the invention.

A sleeve 91 to which an antenna 92 having a feeding pin 93 is attached according to FIG. 8 and presents a further embodiment wherein several feedings for the antennas are used. The shape of the sleeve 91 is adapted to the shape of a respective lens which is housed in the space 90 inside sleeve 91 and is preferably cylindrical. The sleeve 91 is preferably made of a material having low-loss in the microwave range, such as plastic. Sleeve 91 is rigid and the antenna 92 is attached in an appropriate way to the sleeve 91 as described above, including a self-adhesive flexible film on which the antenna is printed or etched and thereafter attached to the sleeve. For illustrative purposes the antenna as shown is attached to the outside of sleeve 91 but can as well be attached to the inside of the sleeve 91 or multiple antennas both on the inside and the outside can be attached to sleeve 91.

Generally, the length of the mentioned antenna devices is selected to be approximately one quarter wavelength of the frequency band to which the antenna is tuned. However, one skilled in the art will appreciate that other lengths may be chosen, such as a half wavelength. One skilled in the art of antennas will even appreciate that various modifications of the antenna geometry result in a change of the antenna performance, e.g. the pitch angle of a spiral antenna influences the operating bandwidth of the antenna. It is understood that the parameters are adapted in an optimal way to the invention and serve as the basis of further alternative embodiments according to the invention.

If the mobile radio terminal has to work in different frequency ranges, different antennas are conventionally used for each frequency range. It is possible to integrate multiple antennas into one single multi-band antenna arrangement around the lens unit.

The antenna can transmit images which are produced by the camera unit, but it is not limited to this sole purpose. The antenna can even be used conventionally for all radio communication of the mobile radio terminal or any other wireless electromagnetic transmission or reception.

There exist a large variety of applications of the antenna-lens-arrangement. Some examples are a mobile radio terminal with an integrated digital camera, an external module attachable to a mobile radio terminal comprising a camera-lens-assembly, a digital camera with integrated wireless transmission, a wireless camcorder, a wireless doorphone, a wireless surveillance camera, a unit replacing the rear view mirror in a vehicle with an integrated camera unit located in the back of a car and a wireless transmission unit transmitting the image to a display accessible to the driver of the vehicle.

It should be emphasised that the term "comprises/comprising" when used in this specification is taken to specify the presence of stated features, integers, steps or components but does not preclude the presence or addition of one or more other features, integers, steps, components or groups thereof.

The present invention has been described above with reference to specific embodiments. However, other embodiments than the preferred above are equally possible within the scope of the appended claims, e.g. different lens unit forms and shapes, antenna forms and shapes, number of antennas or ways of integrating antennas with a lens unit.

The invention claimed is:

1. A mobile radio terminal comprising:
   a camera means for image capturing;
   a compact antenna-lens-assembly comprising:
   an optical camera lens means configured for optically directing an image into said mobile radio terminal for image capturing by said camera means, and
   at least one antenna for communication of said mobile radio terminal,
   said antenna being circumferentially positioned on or around a circumferential side wall of the optical camera lens means.

2. The mobile radio terminal according to claim 1, wherein said optical camera lens means is arranged inside a housing of said mobile radio terminal.

3. The mobile radio terminal according to claim 1, wherein said optical camera lens means comprises a generally cylindrical lens body having two ends and said circumferential side wall.

4. The mobile radio terminal according to claim 1, wherein said antenna is positioned in close vicinity around said circumferential side wall.

5. The mobile radio terminal according to claim 1, wherein said antenna is integrated into said circumferential side wall.

6. The mobile radio terminal according to claim 1, wherein said antenna operates in the frequency range from 800 MHz to 6000 MHz.

7. The mobile radio terminal according to claim 1, wherein said antenna is of spiral or helical form.

8. The mobile radio terminal according to claim 7, wherein said antenna comprises a feeding pin and a grounding pin.

9. The mobile radio terminal according to claim 7, wherein said spiral or helical form has a helix trace of about a quarter wavelength of a desired operating frequency of said antenna.

10. The mobile radio terminal according to claim 1, wherein said antenna has a metallic trace printed or etched on said side wall of said lens body.

11. The mobile radio terminal according to claim 1, wherein said antenna is attached to a carrier.

12. The mobile radio terminal according to claim 11, wherein said carrier is a flex-film or a rigid carrier.

13. The mobile radio terminal according to claim 11, wherein said antenna is attached to the carrier by printing or etching and/or pasting.

14. The mobile radio terminal according to claim 11, wherein said antenna attached to the carrier is arranged around said side wall of said lens body.

15. The mobile radio terminal according to claim 14 wherein said lens body is in the form of a cylinder.

16. The mobile radio terminal according to claim 1, wherein said antenna is a multi-band antenna.

17. The mobile radio terminal according to claim 1, wherein said lens is of low microwave loss material.

18. The mobile radio terminal according to claim 17, wherein said low microwave loss material is plastic or glass.

19. The mobile radio terminal according to claim 1, wherein said antenna is a monopole or a multipole antenna and has a single branch or multiple-branches and consists of a mono-layer or multiple layers.

20. The mobile radio terminal according to claim 1, whereby said mobile radio terminal is a mobile telephone.

* * * * *